United States Patent [19]
Sheahan

[11] Patent Number: 6,021,617
[45] Date of Patent: Feb. 8, 2000

[54] LEAK LOCALIZING USING A COMBINATION OF PENETRATING DEVICES AND BARRIERS

[76] Inventor: James P. Sheahan, 3611 W. Wackerly, Midland, Mich. 48640

[21] Appl. No.: 08/380,112

[22] Filed: Jan. 30, 1995

Related U.S. Application Data

[63] Continuation of application No. 08/027,382, Mar. 8, 1993, abandoned.

[51] Int. Cl.[7] .................................................. E04B 5/00

[52] U.S. Cl. ............................................ 52/410; 411/381

[58] Field of Search .............................. 52/408, 409, 410, 52/747.1; 411/380, 381

[56] References Cited

U.S. PATENT DOCUMENTS 4,834,600  5/1989  Lemke .

FOREIGN PATENT DOCUMENTS 347973  1/1922  Germany ............................... 411/381
349669  3/1922  Germany ............................... 411/381

*Primary Examiner*—Beth Aubrey
*Attorney, Agent, or Firm*—Robert L. McKellar

[57] ABSTRACT

What is disclosed is a method of localizing leaks in roof structures and novel penetrating devices utilized for that purpose. Also disclosed are methods of manufacturing roof structures and methods of repairing roofs. The penetrating devices also have the capability of leak detection when used in conjunction with a barrier layer in a roof structure.

7 Claims, 4 Drawing Sheets

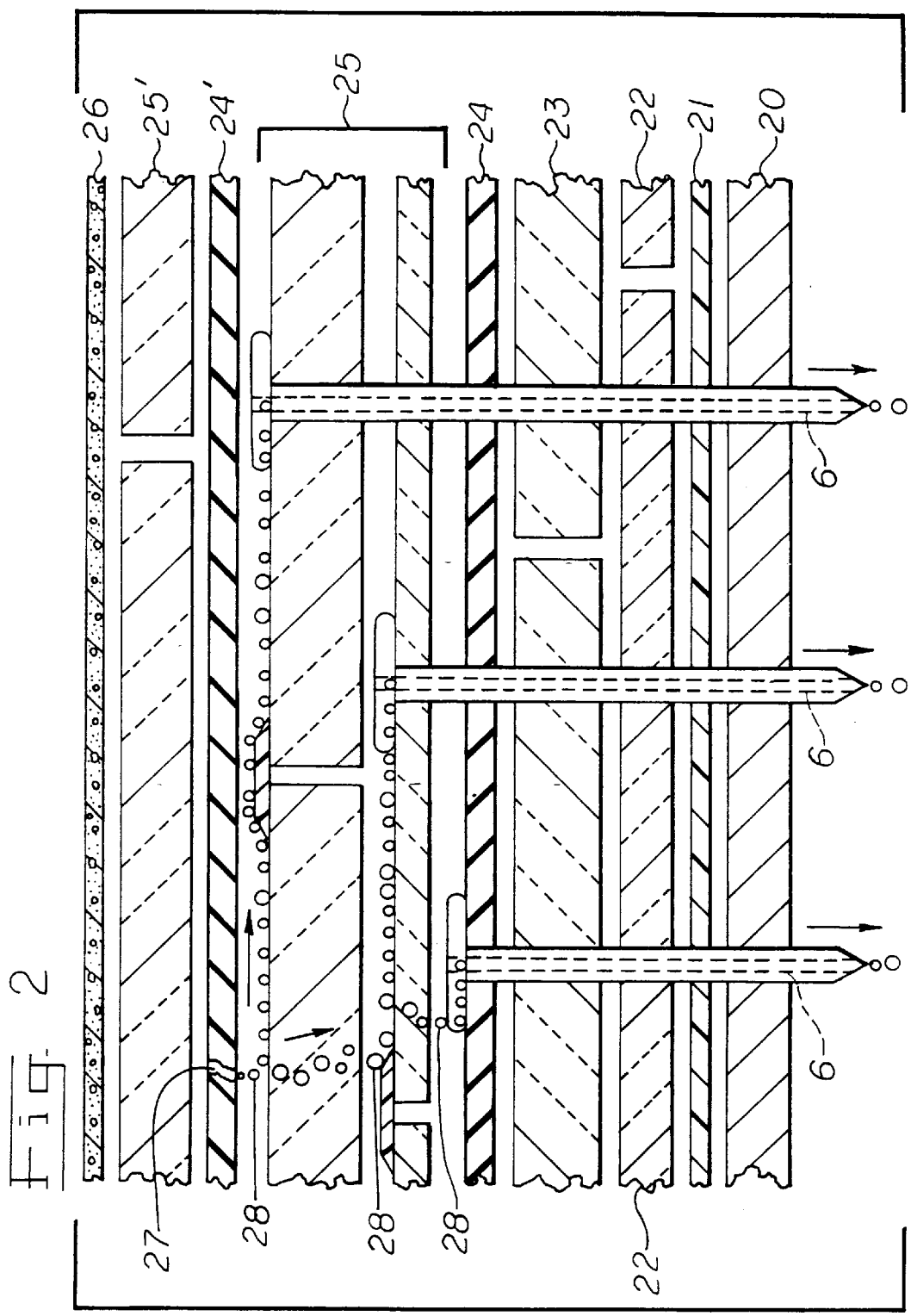

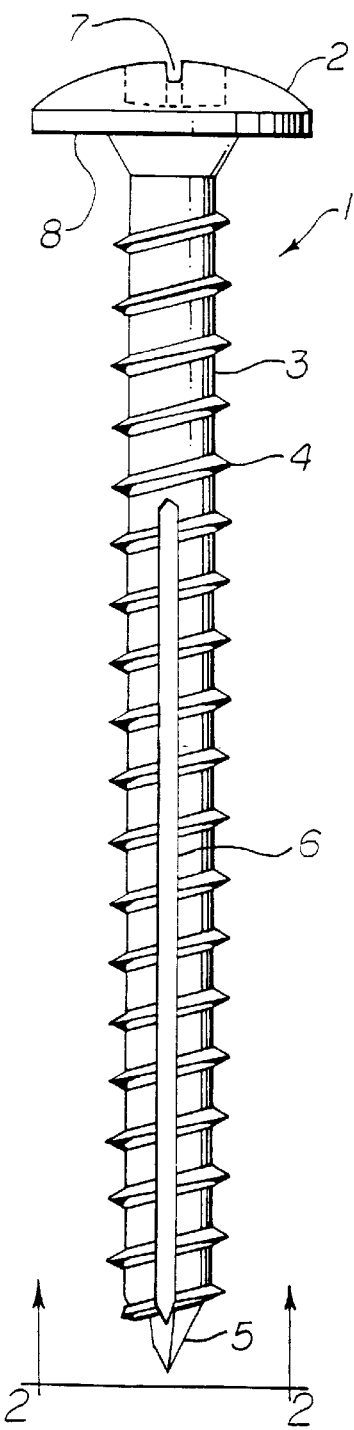
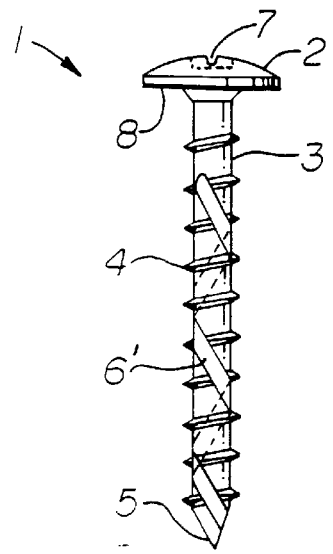
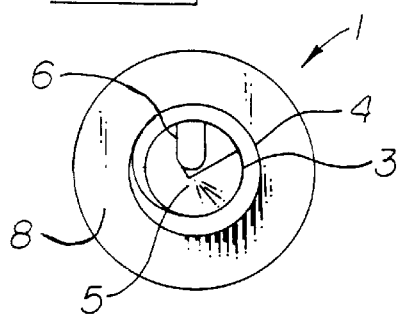
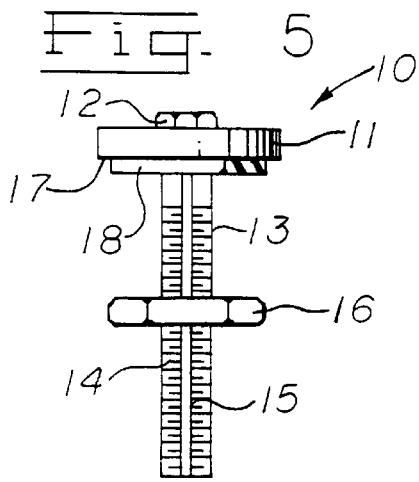

LEAK LOCALIZING USING A COMBINATION OF PENETRATING DEVICES AND BARRIERS

This application is a continuation application of Ser. No. 08/027,382, filed Mar. 8, 1993, now abandoned, which is a divisional application of Ser. No. 07/647,804, issued May 25, 1993 as U.S. Pat. No. 5,212,927.

This invention deals with a method of localizing leaks in a roof system utilizing a combination of penetrating devices and air or water barriers wherein the penetrating devices, in some cases, can also be useful for securing roof structures, especially laminar type roof structures wherein an integral, obstensibly an airproof or waterproof covering is used as part of the laminar structure. These penetrating devices are useful primarily in roofs having a metal supporting deck, but can be used in all roof assemblies wherein the penetrating device can just simply act as a leak localizer without having to perform the function of fastening.

More specifically, this invention deals with a unique method of localizing leaks in roofing systems which allows the detection of such leaks with a certain preciseness by using the penetrating devices of this invention as points of reference.

BACKGROUND OF THE INVENTION

Flat decks account for approximately 50% or more of the roofing market for large industrial and commercial buildings which quite typically have flat or near flat roof surfaces. These roof surfaces generally are multi-layered, that is, they generally have in combination a roof supporting structure which is surmounted by a deck, and at least one layer of air or water impermeable membrane (barrier film or layer), thermal insulation, usually in plank form, and generally a ballast layer. These types of roofs tend to be economical and function quite well as long as there is no break in the water-impermeable membrane. Once the water-impermeable membrane is broken, water enters the roof system and seeps and runs randomly, and laterally between the various layers, soaking the roofing materials and the water eventually enters the interior of the building at points with no obvious relationship to the break in the water barrier layer. When this happens, the roof must be repaired, but often, one cannot detect where the membrane is broken and hence cannot effectively undertake repairs.

Commensurate with the leak problem is the desire to prevent excess air from moving from the interior of the building into the roof assembly and getting beneath the water-impermable membrane which could lead to wind blow off of the roof system. Therefore, it is desirable to have some air escape from inside the roof assembly to the exterior. Thus, it would be desirable to have a system for allowing a limited amount of water to pass downward, and only a limited amount of air to move upward. It would also be most desirable to limit the amount of water and air without compromising the holding capabilities of a penetrating device in those cases where the leak localizers of the instant invention are also fasteners. Having the above described capabilities of holding down roofs has the benefit of lowering the costs of the installation of such roofs. Thus, it would be a benefit if the system used to localize and detect leaks in the roof could act as a more or less permanent system to also hold down the roof system.

The inventive devices of this invention work in combination with the barrier layers on the roof to provide a leak detection system for the roof, that is, the benefit of the devices of the instant invention can only be realized if there is present above the surface of the deck, a water or air barrier film or layer. Such benefit will become apparent in the detailed discussion regarding the invention set forth below.

One object of the instant invention is to provide a penetrating device in combination with a barrier layer in a lamellar roof assembly that can be used as a means of localizing leaks in a lamellar roof system by allowing water to accumulate in specific localities in the lamellae of the roof and to allow limited amounts of water to pass from that accumulation in any lamellae of the roof system downwardly, and a further object of this invention is to provide a means of localizing leaks that will allow for the passage of only a limited amount of air from the interior to the roof assembly which is then allowed to pass through the roof system to the outside.

It is another object of the instant invention is to provide the simplest mechanism possible to provide the maximum hoiddown to maintain a deck system by a fastener.

It is yet another object of this invention to provide a method of manufacturing and repairing roofs such that the roof is susceptible of having localization of water from leaks in the water impermeable membranes, and is susceptible of having leak detection capabilities.

It should be noted that the devices and methods of this invention are especially useful for re-roofing over old lamellar roof systems because it allows one to re-insulate right over the old roof and use the devices of the instant invention for either leak detection, or fastening the whole into place over the old roof and then applying an integral water-impermeable membrane over the new insulation. This system allows one to re-roof a building without tearing into the old roof while using the old roof barriers as the barrier layer in the instant method.

The basic concept of the penetrating devices of the instant invention in order to be useful in the methods described herein is to have an opening from the upper layers of the roof assembly through the roof deck provided by the device. This opening can be between a hole that runs through the roof assembly into and through the supporting deck, and the effective diameter of the shank of such a penetrating device or it can include a device that has an opening through its long axis that runs from the device's uppermost end to the extreme lower end of the device.

For example, the diameter of the cutting point for a self-tapping screw and the shank diameter, and the thread diameters, can be adjusted to allow an opening between the hole in the deck and the shank of the screw to allow passage of limited amounts of water and air while adjusting the thread diameter and the hole in the deck diameter to provide securement or, in the case of a device of this invention where fastening is not required, the shaft of such a device simply has a groove or cut (opening) running the length of the shaft of the device, or yet, another embodiment of the openings in the devices of this invention is the device which has a center bore from its topmost end to the lower most end.

The self-tapping screws described above are called piercing screws, owing to the fact that they do not usually require pre-drilled holes for use because they pierce the metal deck of the roof and make their own hole for entry. These screws generally have threads along the most of the entire length of their shanks which assist the screw in maintaining it's position in the metal deck, i.e. the threads are designed to secure the screw.

Metal decks are normally twenty-two gauge steel and primarily, metal screws which are used to hold down roof systems are manufactured out of various metal alloys in an attempt to provide strength along with the self-tapping capabilities, and provide some corrosion resistance, generally by coating the screws prior to use, or by manufacturing the screws from special metal alloys. The penetrating devices are generally stronger than the substrate to which they are applied. Failure of these devices occurs in the pull-out from the substrate rather than destruction of the screw itself, which screws are nominally ⅛ to ¼ of an inch in diameter for most roof systems, 3/16 being the most preferred. A weakness of a roof system that is frequently observed is at the top side where the materials, such as insulation, or roofing membranes, tear through the heads and washers of such devices causing the materials to be torn off the top of the roof system. The self-tapping characteristics of the screw means they can be installed in one operation, that is, the entire roof system is laid down in its multiple layers, and then fastened with a pattern of the screw type devices by penetrating from the top layer and forcing the screw through the roof deck for securing the entire roof system.

Penetrating devices having the configuration of anchor bolts are also generally known which consist of a bolt or stem which is threaded, has a cap or head portion on one end, and an expandable nut or toggle on the opposite end whereby after insertion through a preformed opening, the nut or toggle is twisted on the threaded bolt or stem and expands as the device is tightened up from above the roof to secure the materials between them. These toggle bolt type of penetrating devices are also useful in the fastening of roofs and for leak detection in that their threaded shanks can be continuously cut to give the same effect as that found in the metal devices of the instant invention.

Yet another type of penetrating device is a device which is simply a hollow plug, manufactured from plastic or metal, whose primary function would be as a leak localizer, without any fastening capability associated with the device. Thus, the primary function of such a plug would be to control the passage of moisture from the top of the plug, to the interior of the building, by having a hollow tube of a certain diameter to control the flow.

Thus, almost any penetrating device can be used in the instant invention, provided it has a water leak capability, and in the cases where fastening is required, it has fastening capabilities.

THE INVENTION

Therefore, in one aspect, this invention deals with a method of localizing leaks in a roof assembly having at least one barrier, the method comprising placing a penetrating device through the roof assembly such that the penetrating device breaches a roof deck supporting the roof, said device having an elongated shank and at least one opening in the shank, said opening extending continuously from the top end of the device through the lower end of the device.

In another aspect of this invention there is provided a method of localizing leaks in a roof assembly having at least one barrier, the method comprising placing a penetrating device through the roof assembly such that the penetrating device breaches a roof deck supporting the roof, said device having an elongated shank and at least one opening in the shank, said opening extending continuously from a point short of the top of the device through the lower end of the device.

Yet another aspect of this invention deals with a method of manufacturing multiple layered roofs having leak detection capabilities, the method comprising the steps of (I) providing a roof support means; (II) surmounting the roof support means with a roof deck; (III) providing a roof system by (a) surmounting the roof deck with a water impermeable membrane, said membrane having a generally flat surface coextensive with the roof deck and, a layer of thermal insulation; (IV) securing the roof system to the roof deck utilizing penetrating devices that breach the roof deck, including at least one penetrating device having an elongated shank and at least one opening in the shank, said opening extending continuously from the top end of the device through the lower end of the device.

Still another aspect of this invention is a method of manufacturing multiple layered roofs having leak detection capabilities, the method comprising the steps of (I) providing a roof support means; (II) surmounting the roof support means with a roof deck; (III) providing a roof system by (a) surmounting the roof deck with a water impermeable membrane, said membrane having a generally flat surface coextensive with the roof deck and, a layer of thermal insulation; (IV) securing the roof system to the roof deck utilizing penetrating devices that breach the roof deck, including at least one penetrating device having an elongated shank and at least one opening in the shank, said opening extending continuously from a point short of the top of the device through the lower end of the device.

There is also provided a method of repairing roofs comprising overlaying an existing roof with a new roof using at least.one device as disclosed and claimed herein.

There is further provided a method of detecting leaks in a roof, the method comprising observing the presence of water, if any, on the underside of a roof deck wherein at least one device of the instant invention has been utilized.

This invention further provides a novel penetrating device for roof assemblies, said device having an elongated shank and at least one continuous opening in the shank, said opening extending continuously from the top end of the device through the lower end of the device.

Also contemplated within the scope of this invention is a novel penetrating device for roof assemblys, said device having an elongated shank and at least one continuous opening in the shank, said opening extending continuously from a point short of the top of the device through the lower end of the device.

Specifically, this invention comprises a penetrating device comprising a toggle bolt having a head surmounted by a lug; a threaded shank; an expandable nut surrounding the threaded shank and having internal threads that mate with the threads of the threaded shank and work integrally therewith, said toggle bolt having at least one continuous opening through its threads and into its shank, said opening extending from the lower end of the threaded shank distal to the head, to a point short of the head, said lug, head, and threaded shank being a unitary structure.

Also specifically, this invention comprises a mechanical fastener for piercing decks comprising a screw having a driveable head, a threaded shank, and a piercing lower end distal to the driveable head, said screw having at least one continuous opening in the shank, said opening extending continuously from the top end of the device through the lower end of the device.

Also contemplated within the scope of this invention is a mechanical device for piercing decks comprising a screw having a driveable head, a threaded shank, and a piercing lower end distal to the driveable head and at least one opening in the shank, said opening extending continuously from a point short of the top of the device through the lower end of the device.

Yet another specific object of this invention is to provide a device for localizing water leaks in a roof system, said device comprising a unitary structure comprising a head surmounting a shank, said device having at least one opening into and along its shank, said opening extending from the end of the shank distal to the head, to a point short of the head.

And finally, there is specifically provided a device for localizing water leaks in a roof system, said device comprising a unitary structure comprising a head surmounting a shank, said device having at least one opening into and along its shank, said opening extending the entire length of the device, including through the head.

SUMMARY OF THE DRAWINGS

FIG. 2 is a sectional side view of a typical roof system where an old roof is covered with a new roof.

FIG. 3A is a full side view of a penetration device of this invention which is also a fastener, in a vertical position wherein the fastener is of the metal piercing type and showing a straight opening.

FIG. 3B is a full side view of a penetration device of this invention which is also a fastener, in a vertical position wherein the fastener is of the metal piercing type and showing a spiral opening.

FIG. 4 is an end view of a penetrating device of this invention to show a straight continuous opening through both the threads and the shank.

FIG. 5 is a full side view of a penetrating device of this invention in a vertical position wherein the device is of the toggle bolt type.

DETAILED DESCRIPTION OF THE DRAWINGS

As indicated above, this invention depends on a penetrating device with an opening which is used in conjunction with a barrier layer.

Figure 1:
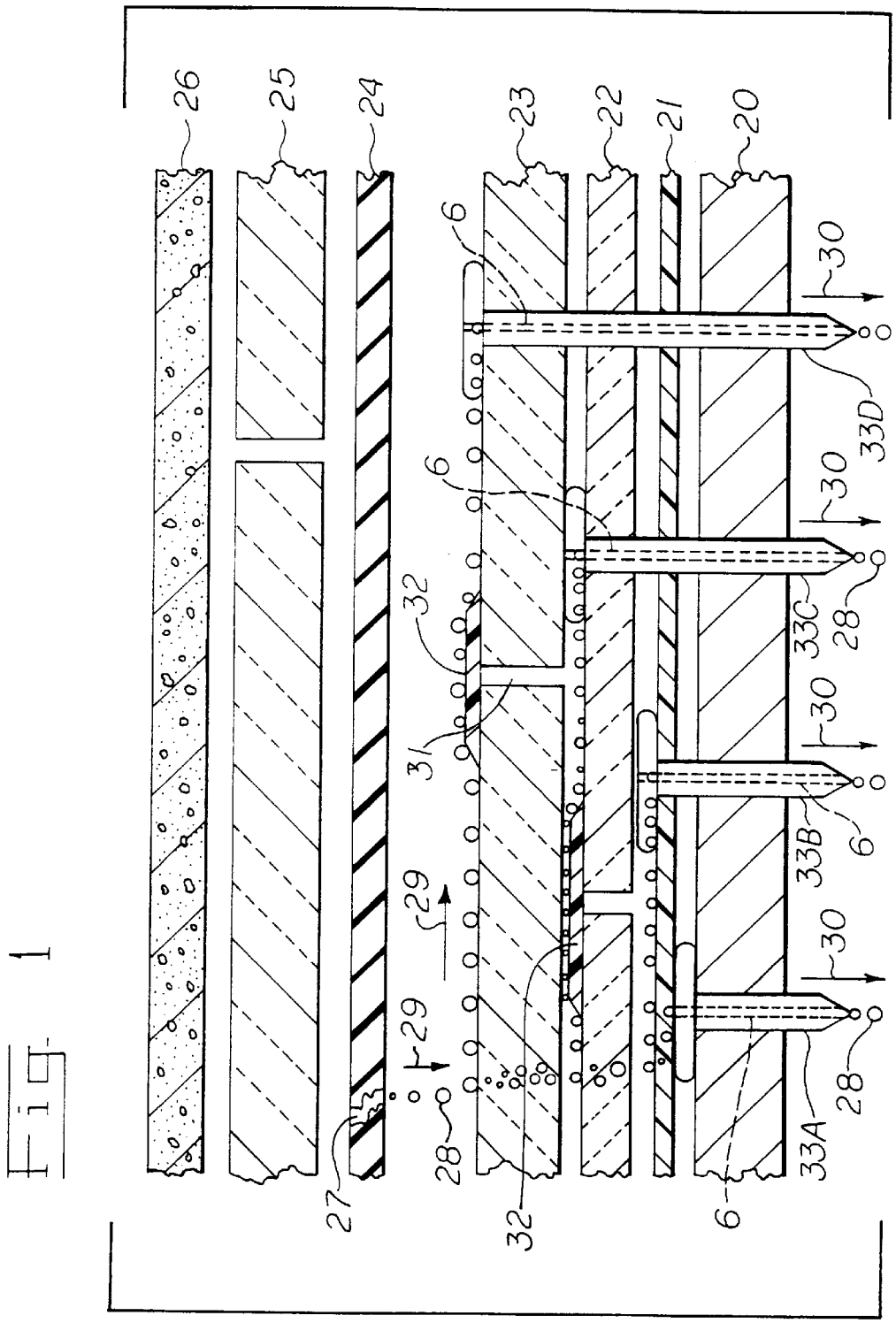
FIG. 1 is a sectional side view of a typical roof system where the roof is a new roof.

Thus, shown in FIG. 1 is a sectional side view of a typical roof system wherein the roof deck 20 is shown as supporting the other layers of the roof such as a vapor barrier 21, insulation layer 22, and insulation layer 23. For purposes of clarity, water barrier 24, insulation layer 25 and ballast layer 26 are shown in an exploded view, it being understood that layers 24, 25, and 26 are normally associated intimately with and overlay the lower layers. The insulation layers are usually laid down in planks, which leaves open channels 31 between the planks, and these channels 31 can be taped as shown by the tape 32. Further, there is shown in FIG. 1, an illustrated break 27 in the water barrier 24, through which water 28 enters the roof system, it being understood that the barrier 24 is normally intended to keep such water out of the roof system. As illustrated, the water 28, once having breached the water barrier 24, can infiltrate the various layers of the roof system and saturate it whereupon, when there is enough water collected at any given barrier level, such as at the surface of layer 23, the water 28 can run indiscriminately and laterally across that layer as shown by arrows 29, until it finds an entry to the layers below, and eventually, into the interior of the buidling as shown by the arrows 30. There is further shown in FIG. 1, several devices 33 as used in this invention, shown at various levels. It is important to note that the penetrating devices can be used at any level just as long as they are used beneath the upper most water barrier 24. Thus, device 33A is shown at the deck 20 level, device 33B is shown at the vapor barrier 21 level, device 33C is shown at the insulation layer 22 level, and device 33D is shown at the insulation layer 23 level any one of which layers can operate to collect the water 28 and localize it to the extent that it arrives at the device placed at that layer. Illustrated in each of the devices 33 is an opening 6, in phantom, which will be discussed infra, suffice it to state that the opening 6 is provided in this invention to allow the passage of the water 28 from any given layer to the interior of the building and to allow air to pass from the roof system to the upper surface of the roof where it is channeled out from under the water barrier 24 by air vents which are not shown. Thus, any of the layers can provide a means for collecting water 28 and funneling the water 28 to one of the devices 33, which allows the water to pass to the interior of the building. When not filled with water, the devices 33 allow the passage of air upward.

Turning now to FIG. 2, there is shown a sectional side view of a typical roof system which has been repaired by covering the old roof system with a new roof using a barrier and devices 33 of this invention to provide a means of localizing and detecting water that has leaked into the old roof system. As in FIG. 1, FIG. 2 shows a roof deck 20, vapor barrier 21, insulation layers 22 and 23, a water barrier 24, an insulation layer 25, an additional water barrier 24', an additional insultion layer 25' and a ballast layer 26. There is also shown a break 27 in the upper water barrier 24', water 28, devices 33 with openings 6 which have been used to secure the new roof over the old roof. Thus, if water breaks through water barrier 24' as shown in FIG. 2, the water is effectively collected by the various layers and passed to the interior, it being understood that the old water barrier 24 can act as a collecting and localizing layer in this system as well, it being understood that the roof deck can act as a collecting and localizing layer if it is constructed of concrete.

Figure 6:
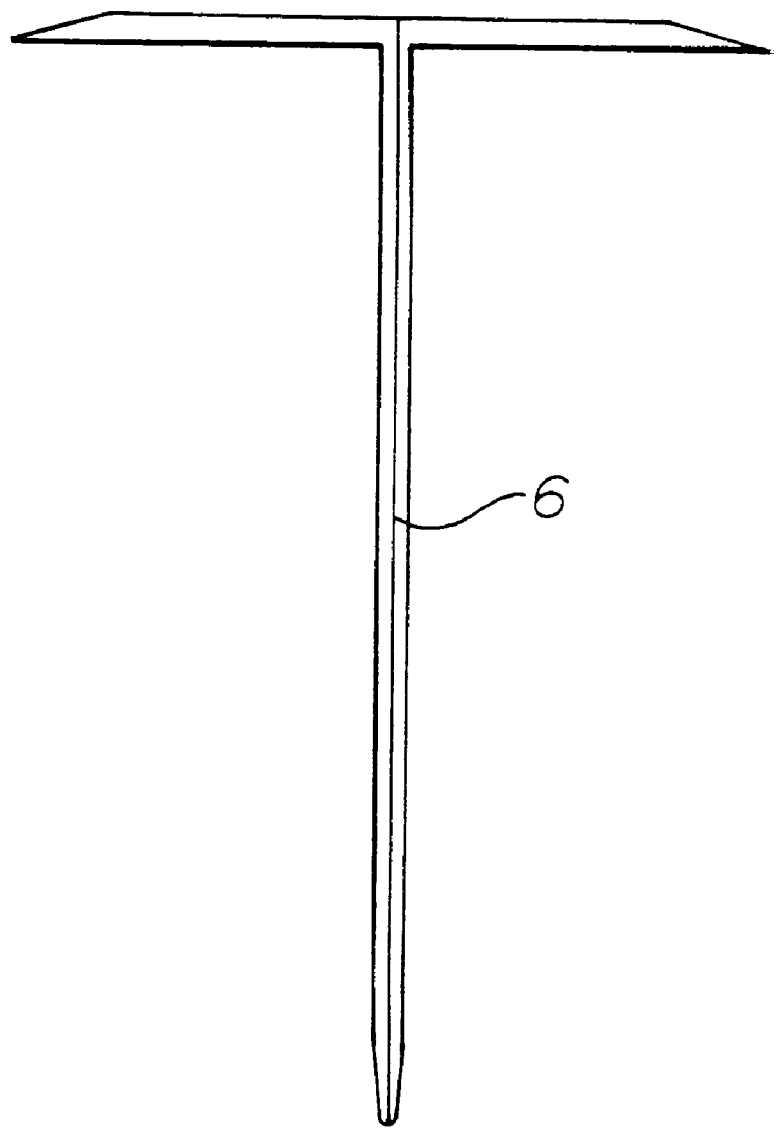
FIG. 6 is a full side view of a device of this invention which is not a fastener showing a full length vertical opening into and through the head thereof.

One penetrating device of this invention comprises a screw 1 having a driveable head 2 which is shown in FIG. 3A as having a Phillips head indention 7 (in phantom), the type of drive slot not being critical as the head could be a conventional straight screwdriver slot or a hexagonal nut configuration as well. The shank 3 has on its surface, threads 4, which secure the screw in the metal deck once a deck is pierced. The piercing is caused by the presence of a piercing head 5 which is at the end of the shank 3 distal to the driveable head 2. The essence of this device is the continuous opening 6 in the threads 4 and into the shank 3. It is critical that the continuous opening 6 be deep enough that it cuts through the threads 4, and into the shank 3, because if the continuous opening 6 is not deeper than the threads 4, the threads 4 will act to cut off both the flow of water downward and the flow of air upward. It is also contemplated by the inventor herein that the continuous opening could be spiral and between the threads until it reached the lower half of the shank, whereupon it would have to cut through the threads to be workable. Also, it is contemplated within the scope of this invention to use devices that have the continuous opening 6 in the full length of the device, including into and through the head of the device. The driveable head 2, the shank 3, the piercing head 5, and the threads 4 are a unitary structure. The precise form of the continuous opening 6 is not critical, as long as it is continuous and deep enough to go through the threads and into the shank and in some cases into the head as described herein and shown in FIG. 6. Such cuts for example could be spiral, angular, straight, and there can be more than one in each such screw. The method of forming the continuous opening is not critical. It can be formed by cutting, machining, forming, or the like.

When employed in securing roofs, the screw is driven, generally by mechanical means, through the various layers of a lamellar roof structure, from the top, until it pierces the metal roof deck and seats the head tightly against the uppermost layer of the roof such that the head undersurface 8 embraces the uppermost surface of the uppermost layer being secured, it being understood that each of such surfaces are below the final water barrier membrane of the roof assembly.

With reference to FIG. 5, there is shown a toggle bolt type of device contemplated by the inventor herein wherein there is shown a toggle bolt 10 having a head 11 which is surmounted by a lug 12. The lug 12 is used to tighten and loosen the toggle bolt 10 when in use. Encircling the undersurface 17 of the head 11 is a gasket 18, which is optional but is generally used to prevent excess air leaks from the interior into the roof structure. Attached to the bottom side of the head 11 is a threaded shank 13 wherein the threads are on the outer surface and fill nearly the entire length of the bolt 10. Shown surrounding the shank 13 is a rotatable and expandable nut 16, which is threaded on its interior such that it's threads mate with and operate integrally with the outside threads 14 of the bolt 10. There is also shown a continuous opening 15 which has the same attributes and configurations as that described above for the piercing type of device. When in use, the metal deck of the roof structure is appropriately dressed with the various layers forming the roof, and a hole is drilled in the desired spot, which hole extends through the entire roof structure, including the metal roof deck. With the expandable nut 16 removed, and the gasket in place, the toggle bolt 10 is dropped into the hole and the expandable nut is placed on the threaded end of the bolt and is twisted on the bolt from below the roof. The expandable nut is wedged into the hole to maintain it in a stationary position as the bolt is twisted to tighten the toggle bolt to compress the gasket. One must recognize that during its movement downward through the layers of the roof, the screw will eventually pierce one or more barrier layers, and with the toggle bolt, the drill will also pass through these barrier layers. This layer acts as the collection source on a relatively flat plane for any water entering the roof system from the upper surfaces. That is, when water penetrates the roof through a leak of some sort, the water will move downwardly until it reaches a barrier layer, where it begins to move randomly and laterally across the barrier layer until it finds an opening of some kind to use in its downward flow to the interior of the building. When the water moves in this manner, it is very difficult to tell where the leak may have originated, as the water can move freely about the upper surface of the barrier layer until it finds an unidentifiable route to the interior of the building, which could be several feet, or several hundred feet from the actual leak.

The penetrating devices of this invention take advantage of the fact that they can operate as a convenient identifiable leak site owing to the fact that the continuous opening 6 in the screw or bolt, if it is large enough according to this invention, to overcome the surface tension of the water, will allow the water to flow down the device and enter the building thus localizing the leak and making detection more precise. In other words, the water leaking from the top of the roof will travel to the barrier layer, but will not have to move very far laterally over the surface of the barrier layer before it finds a convenient entry to the interior of the building because the convenient entry is provided by the continuous opening in the device. When the devices of this invention are laid out on a roof in a known, repetitive, observable, array, the roof repairman knows that the leak from the roof has to be in or near a certain device, that is, a device that is leaking. The device however will not itself act as a leak for water entering from the uppermost surface of the roof. It was mentioned supra that it is also desirable to restrict or limit air from the interior of the building into the roof assembly to prevent blow off of the roof assembly due to high winds. This is the reason barrier membranes are included in the design of roof assemblys. The devices of this invention allow limited air through the same continuous opening in the device. Small openings that only allow for the diffusion of air, do not move enough air to make them practical, thus the amount of opening that the continuous opening has is important to restrict the flow of air upward and to allow water to overcome surface tension effects. In order to balance the flow of water downward and the flow of air upward, the continuous opening should be a nominal minimum of about $1/16$ to $1/8$ inch in diameter.

If one considers that penetrating devices are normally put on every five square feet of roof, an area of one hundred square feet (1 roofing square), would contain up to twenty of the devices of the instant invention. On the top of the roof, roof vents are installed at about every thirty square, or 3,000 square feet. Assuming the hole in the vent is approximately thirty-six square inches, it can be seen that there is a ratio of thirty-six square inches to 3,000 square feet. If one compares this to twenty small holes per roofing square, or sixty small holes per 30,000 square feet, one can determine the relative opening necessary from the underside of the roof. Assume the hole is approximatley $1/16"\times1/16"$ in the threads and shank, this provides an area of 0.004 square inches ×60, or 0.19% compared to the approximate 1% of opening on the topside of the roof. Therefore, the exit holes are larger than the entrance holes. As indicated earlier, diffusion is not the mechanism that will transfer the water in or out. Ventilation is the more important driving force. The roof assembly is constructed so the quantity of air that leaves the roof cross-section to the exterior is greater than the quantity that enters from the interior of the building.

Thus, when the devices of the instant invention are set up in a logical pattern on the roof surface, the detection of leaks is very easy, efficient and economical and a flow of air to the outside is maintained without building up pressure in the membrane assembly.

An additional benefit of the piercing type of device of the instant invention is that by allowing the water to flow through to the interior, the water does not build up undetected around the metal device and thus cause corrosion and deterioration of the device and/or the metal deck. Further, because the penetrating devices of this invention allow the air from the interior to flow out of the interior of the building to the outside, there is a drying effect for any residual water on or near the device.

These and other important objects will become evident to those skilled in the art by the reading and understanding of the instant specification and claims.

That which is claimed is:

1. A penetration device which is a mechanical fastener for piercing decks comprising a screw having a driveable head, a threaded shank, and a piercing lower end distal to the driveable head, said screw having at least one opening through the threads of the threaded shank and into its shank, said opening extending from the piercing lower end to a point short of the driveable head, said piercing lower end being a self tapping screw point having a cutting edge.

2. A penetrating device as claimed in claim 1 wherein the continuous opening is angular.

3. A penetrating device as claimed in claim 1 wherein the continuous opening is spiral.

4. A penetrating device as claimed in claim 1 wherein the continuous opening is straight.

5. A penetrating device as claimed in claim 1 wherein there are at least two continuous openings and they are parallel.

6. A penetrating device as claimed in claim 1 which is manufactured from metal.

7. A penetrating device as claimed in claim 1 which is manufactured from thermoset plastic.

* * * * *